(12) United States Patent
Treilhard et al.

(10) Patent No.: US 11,288,846 B2
(45) Date of Patent: Mar. 29, 2022

(54) CBCT TO MR REGISTRATION VIA OCCLUDED SHAPE RECONSTRUCTION AND ROBUST POINT MATCHING

(71) Applicants: KONINKLIJKE PHILIPS N.V., Eindhoven (NL); Yale University, New Haven, CT (US)

(72) Inventors: John Treilhard, New Haven, CT (US); Ming De Lin, New Haven, CT (US); Jean-François Geschwind, Eindhoven (NL); James Duncan, New Haven, CT (US); Susanne Smolka, New Haven, CT (US)

(73) Assignees: KONINKLIJKE PHILIPS N.V., Eindhoven (NL); YALE UNIVERSITY, New Haven, CT (US)

(*) Notice: Subject to any disclaimer, the term of this patent is extended or adjusted under 35 U.S.C. 154(b) by 0 days.

(21) Appl. No.: 16/333,612

(22) PCT Filed: Sep. 28, 2017

(86) PCT No.: PCT/EP2017/074727
§ 371 (c)(1),
(2) Date: Mar. 15, 2019

(87) PCT Pub. No.: WO2018/060393
PCT Pub. Date: Apr. 5, 2018

(65) Prior Publication Data
US 2019/0251711 A1 Aug. 15, 2019

Related U.S. Application Data

(60) Provisional application No. 62/401,375, filed on Sep. 29, 2016.

(51) Int. Cl.
*G06T 11/00* (2006.01)
*G06T 7/00* (2017.01)
(Continued)

(52) U.S. Cl.
CPC .......... *G06T 11/003* (2013.01); *G06T 7/0014* (2013.01); *G06T 7/0016* (2013.01);
(Continued)

(58) Field of Classification Search
None
See application file for complete search history.

(56) References Cited

U.S. PATENT DOCUMENTS 6,909,794 B2   6/2005 Caspi
7,508,392 B2   3/2009 Barfuss
(Continued)

FOREIGN PATENT DOCUMENTS

JP   2008012027 A   1/2008
WO   2011110867 A1  9/2011

*Primary Examiner* — Matthew C Bella
*Assistant Examiner* — Brian D Shin
(74) *Attorney, Agent, or Firm* — Sherry Austin

(57) ABSTRACT

In an image guidance method, a stream of cone-beam computed tomography (CBCT) images of an anatomical organ is acquired using a CBCT imaging device (34). For each CBCT image (44), the surface of the organ in the CBCT image is segmented to generate a segmented surface (70) of the anatomical organ in the CBCT image. Occluded shape reconstruction (66) using a statistical shape prior (68) may be used to reconstruct a missing or occluded surface portion. A pre-operative medical image (12) of the anatomical organ and the CBCT image are spatially registered by warping one of the images to the other of the images using point set registration of a segmented surface (30) of the organ in the preoperative medical image and the segmented surface of the organ in the CBCT image. A fused image (82) is displayed that combines the warped image and the other image.

21 Claims, 3 Drawing Sheets

(51) Int. Cl.
  *G06T 7/12* (2017.01)
  *G06T 7/143* (2017.01)
  *G06T 7/33* (2017.01)

(52) U.S. Cl.
  CPC ............... *G06T 7/12* (2017.01); *G06T 7/143* (2017.01); *G06T 7/344* (2017.01); *G06T 2200/24* (2013.01); *G06T 2207/10081* (2013.01); *G06T 2207/10088* (2013.01); *G06T 2207/10121* (2013.01); *G06T 2207/20076* (2013.01); *G06T 2207/20221* (2013.01); *G06T 2207/30056* (2013.01); *G06T 2207/30096* (2013.01)

(56) References Cited

U.S. PATENT DOCUMENTS

| | | |
|---|---|---|
| 8,620,055 B2 | 12/2013 | Barratt et al. |
| 9,761,005 B2 | 9/2017 | Tahmasebi Maraghoosh |
| 2009/0097143 A1* | 4/2009 | Wang ................ G02B 7/182 359/871 |
| 2010/0239140 A1* | 9/2010 | Ruijters ................ G06T 19/00 382/130 |
| 2011/0274324 A1* | 11/2011 | Clements ............ A61B 90/36 382/128 |
| 2014/0193053 A1 | 7/2014 | Kadoury et al. |
| 2014/0241600 A1* | 8/2014 | Mountney .............. G06T 7/344 382/128 |
| 2015/0063668 A1* | 3/2015 | You ........................ G06T 7/11 382/131 |

* cited by examiner

CBCT TO MR REGISTRATION VIA OCCLUDED SHAPE RECONSTRUCTION AND ROBUST POINT MATCHING

CROSS-REFERENCE TO PRIOR APPLICATIONS

This application is the U.S. National Phase application under 35 U.S.C. § 371 of International Application Serial No. PCT/EP2017/074727, filed on Sep. 28, 2017, which claims the benefit of U.S. Patent Application No. 62/401,375, filed on Sep. 29, 2016. This application is hereby incorporated by reference herein.

This invention was made with government support under CA206180 awarded by National Institutes of Health. The government has certain rights in the invention.

FIELD

The following relates generally to the image guided medical procedure arts, medical imaging arts, liver cancer treatment arts, and related arts.

BACKGROUND

Liver cancer is one of the most common cancers. Greater than 800,000 new cases per year of hepatocellular carcinoma (HCC, primary liver cancer), and greater than 300,000 cases of metastatic disease, are diagnosed worldwide each year. Transcatheter arterial chemoembolization (TACE) is the mainstay for treatment in more than 70% of these patients. TACE is an x-ray image-guided, interventional oncology procedure in which chemotherapeutic drug is delivered from a catheter in the hepatic artery locally to the tumor itself. The procedure is commonly guided by cone beam computed tomography (CBCT) imaging using a contrast agent that is administered intra-arterially so as to most effectively image the arterial vasculature that is feeding the tumor. Two-dimensional (2D) fluoroscopy may also be used to provide real-time guidance imaging.

A typical TACE treatment workflow is as follows. A baseline multiphasic contrast enhanced MRI (CE-MRI) is performed using intravenous contrast agent injection to diagnose the liver cancer. The TACE procedure is thereafter performed (e.g., 4-6 weeks after diagnosis in some typical timelines) using a C-arm CBCT imaging device to provide guidance imaging for intra-procedural catheter guidance. During the TACE procedure, the pre-operative CE-MRI image is displayed as a reference, while the CBCT image is displayed to provide near real-time guidance imaging. CBCT image updates can be performed as rapidly, e.g. one 240° image sweep every five seconds in some commercial CBCT devices. The intra-procedural CBCT imaging provides real-time feedback on the location and density of contrast agent (and by extension chemotherapeutic drug) deposition during the TACE procedure. Optionally, fluoroscopy can provide even more up-to-date image guidance, albeit only in 2D. Following the TACE procedure, a follow-up CE-MRI is usually performed to assess patient response to the TACE therapy, and additional TACE procedures may be performed as warranted by the progress assessment.

The TACE procedure is a complex surgical procedure, whose successful performance requires the surgeon to integrate numerous information sources (e.g. the reference CE-MRI, the CBCT image passes, 2D fluoroscopy imaging, tactile feedback from the catheter) in parallel. Typically, information from the multiple imaging modalities is provided independently. In particular, the surgeon is provided with no assistance in merging the complex three-dimensional (3D) information provided pre-intervention CE-MRI with corresponding 3D information provided by the intra-procedural CBCT.

The following discloses a new and improved systems and methods that address the above referenced issues, and others.

SUMMARY

In one disclosed aspect, an image guidance device is disclosed, including a cone beam computed tomography (CBCT) imaging device, an electronic processor, a display, and at least one non-transitory storage medium storing instructions readable and executable by the electronic processor to spatially register a liver imaged in a pre-operative medical image and the liver imaged in a CBCT image acquired by the CBCT imaging device by performing a spatial registration process. That process includes: segmenting the surface of the liver in the CBCT image to generate a segmented surface of the liver in the CBCT image; spatially registering the pre-operative medical image and the CBCT image by warping one of the pre-operative medical image and the CBCT image to the other of the pre-operative medical image and the CBCT image using point set registration of a segmented surface of the liver in the pre-operative medical image and the segmented surface of the liver in the CBCT image; and displaying, on the display, a fused image combining the warped one of the pre-operative medical image and the CBCT image and the other of the pre-operative medical image and the CBCT image.

In another disclosed aspect, a non-transitory storage medium stores instructions readable and executable by an electronic processor to spatially register an anatomical organ imaged in a pre-operative medical image and the anatomical organ imaged in a cone beam computed tomography (CBCT) image by performing a spatial registration process including: generating a segmented surface of the anatomical organ in the CBCT image by segmenting the surface of the anatomical organ in the CBCT image and performing occluded shape reconstruction using a statistical shape prior for the anatomical organ to reconstruct a portion of the segmented surface of the anatomical organ in the CBCT image; and spatially registering the pre-operative medical image and the CBCT image by warping one of the pre-operative medical image and the CBCT image to the other of the pre-operative medical image and the CBCT image using point set registration of a segmented surface of the anatomical organ in the pre-operative medical image and the segmented surface of the anatomical organ in the CBCT image.

In another disclosed aspect, an image guidance method is disclosed. A stream of cone beam computed tomography (CBCT) images of an anatomical organ is acquired using a CBCT imaging device. For each CBCT image of the stream, a spatial registration process is performed using an electronic processor and a display. The spatial registration process includes: segmenting the surface of the anatomical organ in the CBCT image to generate a segmented surface of the anatomical organ in the CBCT image; spatially registering a pre-operative medical image of the anatomical organ and the CBCT image by warping one of the pre-operative medical image and the CBCT image to the other of the pre-operative medical image and the CBCT image using point set registration of a segmented surface of the anatomical organ in the pre-operative medical image and the segmented surface of the anatomical organ in the CBCT image; and displaying, on the display, a fused image combining the warped one of the pre-operative medical image and the CBCT image and the other of the pre-operative medical image and the CBCT image.

One advantage resides in providing a fused image combining a cone-beam computed tomography (CBCT) guidance image with a pre-operative medical image.

Another advantage resides in performing such image fusion for each CBCT image of a stream of CBCT guidance images in order to generate the fused image updated at an update rate of the stream of CBCT guidance images.

Another advantage resides in providing for spatial registration of a liver or other anatomical organ in a CBCT guidance image and in a pre-operative medical image including spatially registering a portion of the surface of the anatomical organ that is occluded or not imaged in the CBCT guidance image.

Another advantage resides in providing visual integration of a stream of CBCT guidance images with a pre-operative magnetic resonance image (MRI) or multiple-detector computed tomography (MDCT) pre-operative medical image.

A given embodiment may provide none, one, two, more, or all of the foregoing advantages, and/or may provide other advantages as will become apparent to one of ordinary skill in the art upon reading and understanding the present disclosure.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
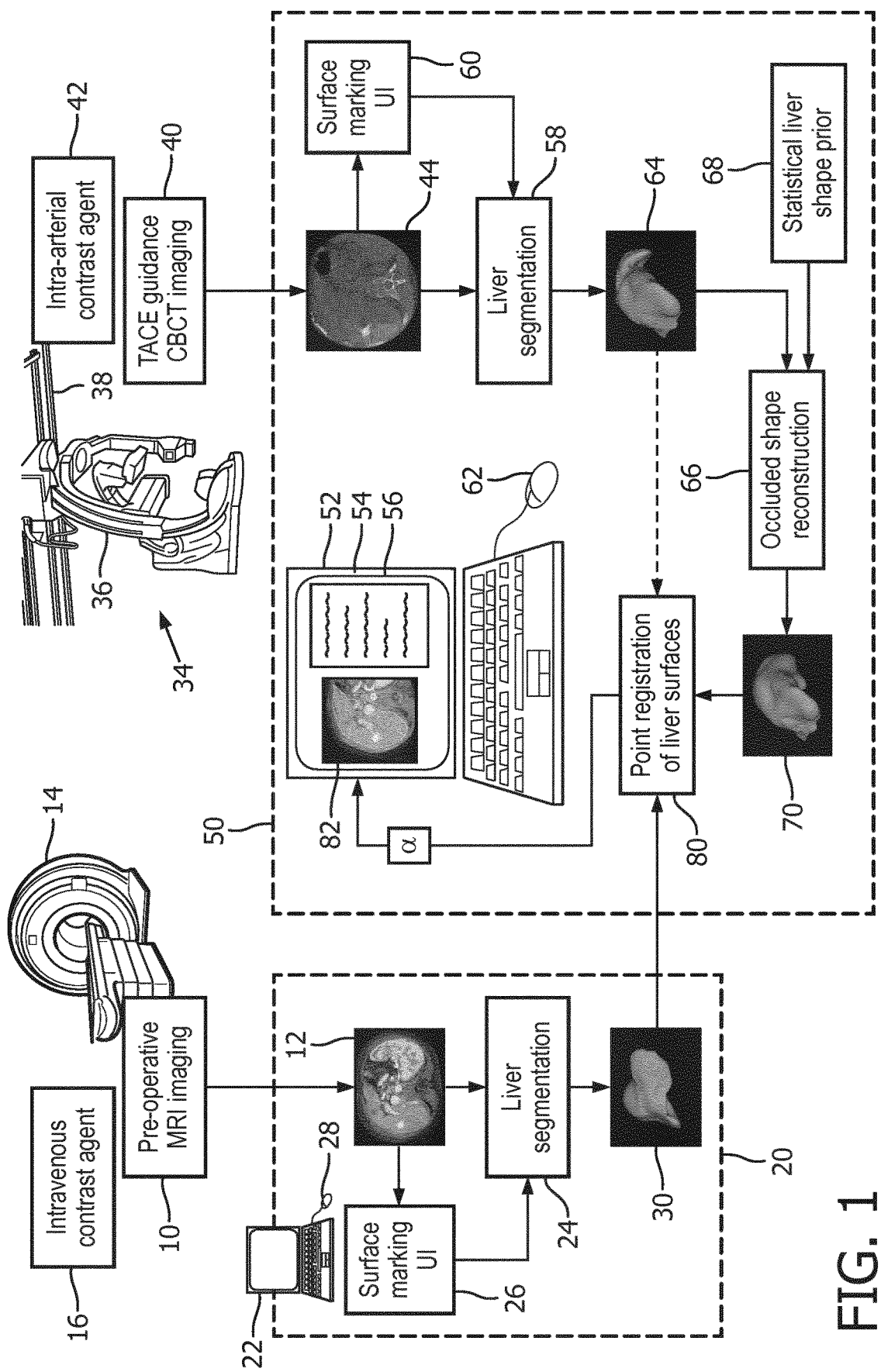
FIG. 1 diagrammatically shows an illustrative system for imaging-based diagnosis of liver cancer and for performing a transcatheter arterial chemoembolization (TACE) procedure for treating same.

One way to provide an intuitive merger of the information embodied by the cone-beam computed tomography (CBCT) guidance images and the reference pre-operative medical image (typically an MRI image or a MDCT image) would be to spatially register the CBCT image and the pre-operative medical image and then display them as a fused image, e.g. with one image displayed atop the other as a partially transparent overlay image.

However, the registration of the intra-procedural CBCT image to the baseline MRI or MDCT pre-operative medical image is a challenging problem for several reasons. One difficulty is that the CBCT field of view (FOV) is typically cylindrical in shape, in comparison to a typically rectangular FOV for the baseline MRI or MDCT pre-operative medical image. Another difficulty is that in many cases the liver is not visible in its entirety in the CBCT FOV. Furthermore, the CBCT guidance images are often of low quality and prone to artifacts. This is a consequence of factors such as the incomplete imaging arc (e.g., in a C-arm configuration the arm may traverse about 240° rather than the full 360° that would provide a complete imaging data set) and the short scan time to achieve near real-time CBCT imaging (e.g., a single-arc pass may be performed in about 5 seconds). In the case of an MRI pre-operative medical image, the difference in imaging modalities leads to divergent contrast characteristics for example, as opposed to MRI imaging, CBCT imaging does not provide soft-tissue contrast. This reduces the efficacy of intensity-based registration which seek to align intra-hepatic anatomical structures.

Still further, the contrast agent delivery pathways are often different. The pre-operative medical imaging typically employs intravenously delivered contrast agent for which uptake is, at least initially, into the venous system. By contrast, a transcatheter arterial chemoembolization (TACE) procedure delivers chemotherapeutic drug from a catheter into the hepatic artery locally to the tumor itself. To maximize imaging for TACE, therefore, it is common practice to deliver the CBCT contrast agent intra-arterially, sometimes using the same arterial catheter employed in carrying out the TACE procedure. Thus, the uptake for the CBCT guidance images is, at least initially, into the arterial system. This difference (intravenous contrast agent delivery for the pre-operative medical image versus intra-arterial contrast agent delivery for the CBCT guidance images) further complicates image registration as the contrast-enhanced vasculature is not the same.

In approaches disclosed herein, intra-procedural CBCT images are registered to the baseline MRI or MDCT pre-operative medical image (typically, although registration of the pre-operative image to the CBCT image is also contemplated). This is done by point set registration of the reconstructed liver surfaces. In other words, the liver surface is segmented in each of the respective CBCT and pre-operative images, and each liver surface is represented by a point set, which may for example be arranged as a non-planar grid of equally spaced points spread over each segmented liver surface. The point set of the liver surface in one image is warped to match the point set of the liver surface in the other image, whereby the one image is warped to register with the other image. This point registration facilitates intra-procedural adjustment of treatment strategy, on the basis of dynamic feedback to evaluate adequate drug deposition in the target lesion(s), which increases the relevance and utility of intra-procedural CBCT imaging.

While described with reference to a TACE procedure performed on the liver, more generally the disclosed approaches for spatially registering an intra-procedureal CBCT guidance image with a pre-operative medical image may be employed for substantially any anatomical organ (e.g. liver, prostate, heart, et cetera), and will find useful application in providing image guidance for TACE or other image-guided interventional procedures.

The disclosed approaches are based in part on the observation made herein that the shape of the liver and the corresponding spatial organization of its internal structures remain substantially invariant between baseline MRI, MDCT, or other pre-operative medical imaging and the subsequent intra-procedural CBCT imaging. For the case of liver imaging in particular, the large volume of the liver ensures that its shape, size, and orientation remain approximately invariant even under the influence of tumor growth, parenchyma changes, and inflammatory processes. Therefore, point-registration of the liver surfaces segmented on both the baseline pre-operative medical image and the intra-procedural CBCT image has the effect of robustly aligning internal hepatic structures, such as HCC lesions, whose spatial location and orientation remains consistent between imaging modalities. Moreover, by premising the spatial registration on the alignment of the liver surfaces, irrelevant and potentially counter-productive and misleading information is excluded from the registration process, such as the size, position, and orientation of the gastrointestinal (GI) tract, lungs, and other surrounding anatomical structures.

Another difficulty is that the entire liver is often not fully imaged in the CBCT images. This is typically due to the typically smaller cylindrical FOV of the CBCT imaging as compared with the pre-operative medical imaging, and the incomplete scanning arc (e.g., about 240° in some CBCT imaging devices employing a C-arm configuration). To address the situation in which the liver is partially excluded from the CBCT FOV, it is disclosed to employ occluded surface reconstruction utilizing a statistical liver shape prior to reconstruct the missing or occluded portion of the liver surface in the CBCT image. Then, this entire segmented liver surface, including the reconstructed portion, is used in the point registration with the corresponding liver surface in the pre-operative medical image. In an alternative embodiment, the reconstruction is not performed and instead the point set registration is limited to matching the portion of the surface of the liver actually imaged in the CBCT image with the corresponding portion of the surface of the liver in the pre-operative medical image.

Thus, it is disclosed herein to address the challenging problem of multi-modal registration of intra-procedural CBCT to a pre-operative medical image (e.g. acquired by MRI or MDCT imaging) via point set registration of segmented liver surfaces in both images. If the liver is not wholly visible in the CBCT FOV, its global shape is optionally reconstructed by integrating occluded shape reconstruction using a statistical shape prior for the liver. In some illustrative examples, the following workflow is employed. The liver surface is segmented (either manually or automatically) in the MRI or MDCT pre-operative medical image. The liver surface is also segmented (either manually or automatically) in each CBCT image. If the liver is not wholly visible in the CBCT FOV, occluded shape reconstruction is optionally employed using a statistical liver shape prior to reconstruct the global surface of the liver. Point registration (for example, robust point matching) of the liver surface segmented/reconstructed from the CBCT onto that segmented from the MR is then applied to non-rigidly register the CBCT image to the pre-operative medical image. Alternatively, it is contemplated to analogously register the pre-operative medical image to the CBCT image. A fused image is then generated from the spatially registered images. To provide near real-time CBCT guidance imaging in this way, the foregoing procedure is preferably repeated for each CBCT image of a stream of CBCT images acquired by the CBCT imaging device.

With reference now to FIG. 1, an illustrative system is shown for imaging-based diagnosis of liver cancer and for performing a transcatheter arterial chemoembolization (TACE) procedure for treating same. The initial liver cancer diagnosis is made with the aid of medical imaging 10 which acquires medical images 12 using a medical imaging device 14. For liver cancer diagnosis, the diagnostic medical imaging device 14 is typically a magnetic resonance imaging (MRI) imaging device, although a multiple-detector computed tomography (MDCT) imaging device may also be used. Assuming that TACE therapy follows, these initial diagnostic images can also be considered to be pre-operative medical images 12, and this term will generally be used in the following. The pre-operative medical imaging 10 is generally performed using a contrast agent, and more particularly an intravenous contrast agent 16 is typically employed. In general, the contrast agent 16 may be any pharmaceutical that can be administered intravenously and enhances x-ray contrast.

The pre-operative medical image 12 is processed by an electronic processor 20, such as an illustrative computer 22. This processing may include an image reconstruction step, e.g. reconstructing raw k-space data acquired by the imaging device 14 comprising an MRI device to generate an MRI image; or reconstructing raw x-ray absorption data acquired by the imaging device 14 comprising an MDCT imaging device to generate an MDCT image. Alternatively, this image reconstruction may be performed by an electronic processor integral with the imaging device 14. In either case, the resulting pre-operative medical image 12 is segmented in a liver segmentation operation 24, which may be an automatic image segmentation process (e.g., detecting the liver surface as high image gradient surfaces), a manual segmentation process, or a semi-automated segmentation process. In manual or semi-automated segmentation, the user (e.g. a radiologist or oncologist) operates a surface marking user interface (UI) 26 which displays selected slices of the pre-operative medical image 12 (e.g., axial, sagittal, and/or coronal slices, and/or oblique slices chosen by the user) and enables the user to provide liver surface landmarks, e.g. using a mouse 28 or other pointing device to click on points along the liver surface which the UI 26 then connects using spline curves or other interpolation to delineate the liver surface. The result of the liver segmentation operation 24 is the segmented surface 30 of the liver in the pre-operative medical image 12.

The pre-operative medical imaging 10 is performed prior to the TACE procedure. In some common clinical workflows, the pre-operative medical imaging 10 may be performed a few day, or a few weeks, prior to the TACE procedure, although other time intervals are also contemplated. Typically, the liver segmentation 24 will also be performed prior to the start of the TACE procedure.

With continuing reference to FIG. 1, on the day of the TACE procedure, the patient is prepared for surgery and loaded into a cone-beam computed tomography CBCT) imaging device 34. The illustrative CBCT imaging device 34 is a Philips XperCT™ CBCT imaging device having a C-arm 36 that carries an x-ray source on one end and an x-ray detector array on the opposite end of the C-arm 36, oriented such that an x-ray cone-beam emitted by the x-ray source impinges onto the x-ray detector ray. The illustrative C-arm 36 is mounted on overhead rails 38 to provide flexibility in positioning the C-arm 36 over the patient disposed on a surgical table (not shown); however, other and/or additional support structures/configurations are also contemplated. During the TACE procedure, CBCT imaging 40 is performed. To provide uptake contrast, prior to the CBCT imaging the patient is administered an x-ray contrast agent 42 that is typically administered intra-arterially so as to maximize uptake into the arterial vasculature feeding the malignant tissue. Optionally, the contrast agent 42 is delivered using the same arterial catheter (not shown) that is used by the surgeon to perform the TACE procedure. The intra-procedural CBCT imaging 40 acquires a stream of CBCT images, an illustrative one CBCT image 44 being shown.

As further illustrated in FIG. 1, each CBCT image 44 is processed by an electronic processor 50, such as an illustrative computer 52 having a display 54 (e.g. an LCD display, plasma display, or so forth). More generally, the display 54 is operatively connected with the electronic processor 50 so that the electronic processor can operate the display 54 to display images or other information 56. Optionally, the electronic processor 50 may perform the CBCT image reconstruction step, e.g. reconstructing raw x-ray absorption data acquired using the x-ray detector on the C-arm 36 to generate a CBCT image. Alternatively, this image reconstruction may be performed by an electronic processor integral with the CBCT imaging device 34. In either case, the resulting CBCT image 44 is segmented in a liver segmentation operation 58, which may be an automatic image segmentation process (e.g., detecting the liver surface as high image gradient surfaces), a manual segmentation process, or a semi-automated segmentation process. In manual or semi-automated segmentation, the user (e.g. the TACE surgeon or a surgical assistant) operates a surface marking user interface (UI) 60 which displays selected slices of the CBCT image 44 (e.g., axial, sagittal, and/or coronal slices, and/or oblique slices chosen by the user) and enables the user to provide liver surface landmarks, e.g. using a mouse 62 or other pointing device to click on points along the liver surface which the UI 60 then connects using spline curves or other interpolation to delineate the liver surface. Because the CBCT imaging 40 generally generates a stream of CBCT images 44 at a rapid update rate, e.g. every 5 seconds in some implementations, fully manual segmentation of each CBCT image 44 of the stream is generally not practical; however, it may be practical to manually assign liver surface landmarks for a first CBCT image 44 of the stream and thereafter use the landmark as an approximate initial starting point for automated segmentation of subsequent CBCT images of the stream, under the assumption that the patient is held stationary during the TACE procedure. Alternatively, as already noted, the liver segmentation 58 may be fully automated in which case the surface marking UI 60 may be omitted. The result of the liver segmentation operation 58 is the segmented surface 64 of the liver in the CBCT image 44.

If the entire liver is not imaged in the CBCT image 44, e.g. because a portion of the liver lies outside of the CBCT FOV, then optionally the missing portion of the liver surface can be reconstructed by an occluded shape reconstruction operation 66 using a statistical liver shape prior 68, for example generated as the shape of the liver averaged over CBCT images acquired for a number of different persons. The occluded shape reconstruction 66 may, for example, entail deforming the statistical liver shape prior 68 so that the deformed statistical liver shape prior 68 matches the segmented liver surface generated by the liver segmentation 58, with the deformation to match the segmented surface being constrained to employ certain transforms such as a uniform enlargement/shrinkage of the statistical liver shape prior 68, rigid rotation and/or translation of the statistical liver shape prior 68, or so forth. In this way, the portion of the deformed statistical liver shape prior 68 that corresponds to the portion of the liver surface that is missing or occluded in the CBCT image 44 serves as a reasonably accurate approximation of this missing or occluded surface portion. The result of the liver segmentation 58 followed by the occluded shape reconstruction 66 is the segmented surface 70 of the liver in the CBCT image 44.

With continuing reference to FIG. 1, an operation 80 spatially registers the pre-operative medical image 12 and the CBCT image 44 by warping one of the pre-operative medical image 12 and the CBCT image 44 to the other of the pre-operative medical image 12 and the CBCT image 44. Typically, the CBCT image 44 is warped to spatially register with the pre-operative medical image 12 this has the advantage that as the stream of CBCT images are processed they are warped to match the static pre-operative medical image 12. The spatial registration 80 uses point set registration of the segmented surface 30 of the liver in the pre-operative medical image 12 and the segmented surface 70 of the liver in the CBCT image 44. This entails defining a set of points spread across the segmented surface 30, a corresponding set of points spread across the segmented surface 70, and determining a spatial transformation (typically although not necessarily a non-rigid or non-linear transformation) to match the points on the segmented surface 70 of the liver in the CBCT image 44 to the points on the segmented surface 30 of the pre-operative medical image 12. (This assumes that the CBCT image 44 is to be warped to match the pre-operative medical image 12). Numerous point set registration approaches are known for determining the transform, such as (by way of non-limiting illustrative example) robust point matching. The determined spatial transform is then applied to voxels of the image being warped to produce the desired warping.

The occluded shape reconstruction operation 66 provides certain advantages including providing a more complete segmented liver surface 70 for matching to the complete liver surface 30 provided by the pre-operative medical image 12. However, it is alternatively contemplated to omit the occluded shape reconstruction operation 66, as diagrammatically indicated in FIG. 1 by the dotted arrow inputting the segmented surface 64 into the point registration operation 80. In this case, the point set registration suitably employs a point set only over the segmented surface 64 omitting any missing portion of the liver surface, and the point set over the segmented surface 30 from the pre-operative medical image 12 extends only over the portion of the liver surface also captured in the CBCT image 44.

The resulting spatially registered images are preferably displayed on the display 54 as a fused image 82 combining the warped one of the pre-operative medical image and the CBCT image and the other of the pre-operative medical image and the CBCT image. In the illustrative example, the fused image 82 combines the warped CBCT image and the pre-operative medical image by showing the warped CBCT image as an overlay displayed on top of the reference pre-operative medical image with the overlay having partial transparency controlled by a transparency factor $\alpha$.

The electronic processors 20, 50 may, for example, be embodied as respective computers 22, 52 (e.g. a desktop computer, network-based server computer, a dedicated imaging device control computer, various combinations thereof, or so forth) that executes instructions read from one or more non-transitory electronic storage media (e.g. one or more hard drives, optical disks, solid state drives or other electronic digital storage devices, various combinations thereof, or so forth) that stores the instructions. The computer 52 used during the TACE procedure includes or has operative access to at least one display 54 (e.g. an LCD display, plasma display, or so forth). The illustrative example includes separate computers 22, 52 for the pre-operative medical image segmentation and the TACE procedure image guidance support, respectively. This reflects a typical implementation at a hospital or other medical facility, in which the pre-operative medical imaging 10 is performed at a radiology laboratory (e.g. in an MRI room) while the TACE procedure is performed at a different facility, e.g. a surgical suite, image-guided medical procedure facility, or so forth. Communication between the facilities may be by way of a Picture Archiving and Communication System (PACS), radiology information system (RIS), or so forth (not shown). Moreover, it is contemplated for the two separate computers 22, 52 to be replaced by a single computer or other single electronic processor that performs both pre-operative imaging and TACE procedure image guidance operations.

Figure 2:
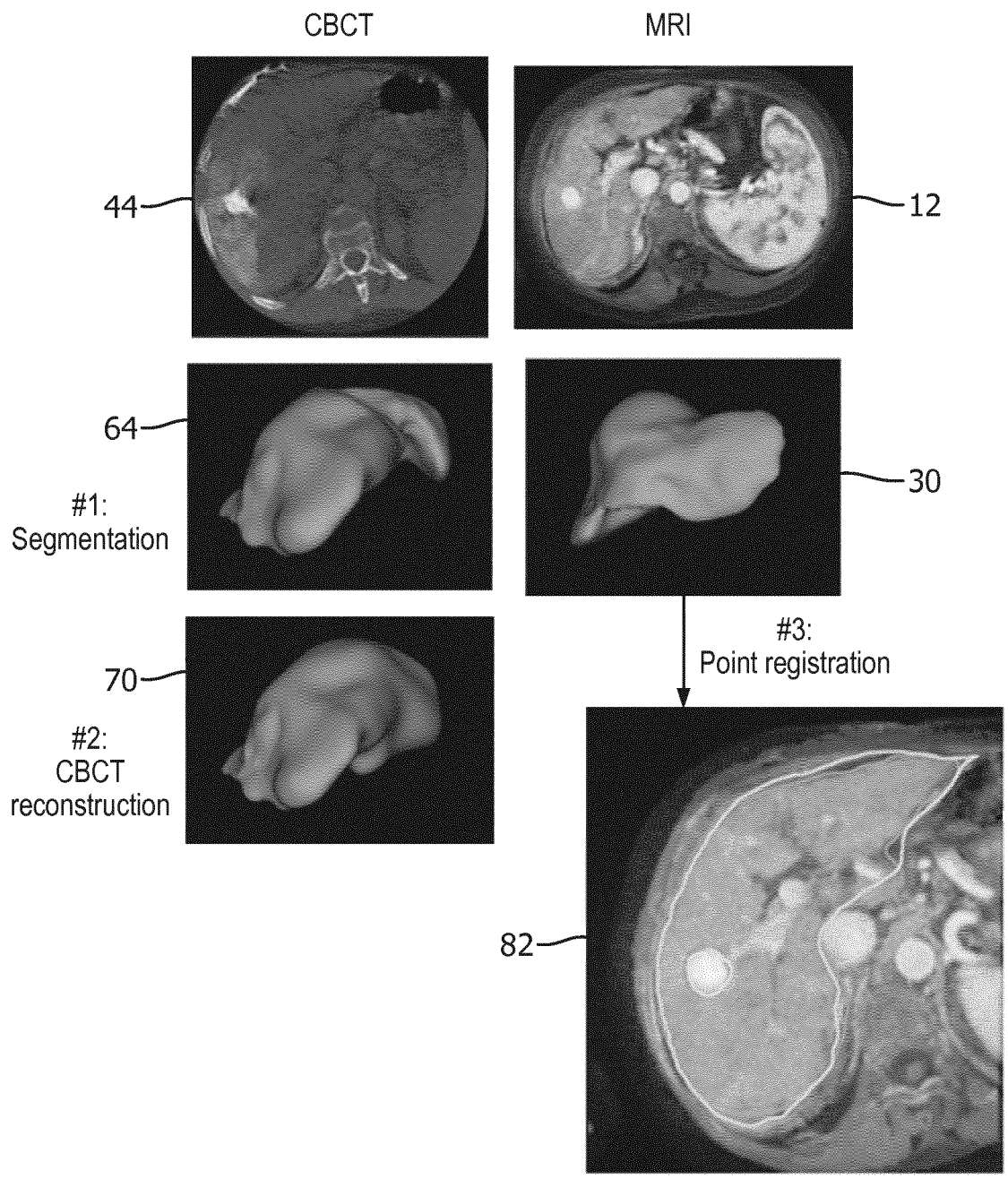
FIG. 2 shows enlarged views and diagrammatic workflow connections of the various images and segmentations shown in FIG. 1.

With reference to FIG. 2, the various images 12, 44, 82 and segmented surfaces 30, 64, 70 shown in FIG. 1 are reproduced in enlarged form. The notation "#1: Segmentation" in FIG. 2 corresponds to the operations 24, 58 of FIG. 1. The notation "#2: CBCT reconstruction" in FIG. 2 corresponds to the operation 66 of FIG. 1. The notation "#3: Point registration" in FIG. 2 corresponds to the operation 80 of FIG. 1.

Figure 3:
FIG. 3 diagrammatically shows some experimental results as described herein.

With reference to FIG. 3, good performance of an embodiment of the disclosed image registration approach is illustrated as compared with other types of image registration. The lefthand image in FIG. 3 shows the fused image obtained using intensity-based rigid registration. The center image of FIG. 3 shows the fused image obtained using intensity-based affine registration. The rightmost image of FIG. 3 shows the fused image obtained using point registration of liver surfaces as disclosed herein. As seen in FIG. 3, the intensity-based registration methods (left and middle fused images) comprehensively fail, whereas the disclosed point registration of the liver surfaces (right image) aligns the internally segmented HCC lesion with high fidelity.

Although disclosed with illustrative reference to fusing pre-operative and CBCT images of the liver as is particularly useful for providing TACE image guidance, it is alternatively contemplated to employ the disclosed approaches for fusing pre-operative and CBCT images of another anatomical organ, such as the prostate.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:

1. An image guidance device comprising:
a cone beam computed tomography (CBCT) imaging device;
an electronic processor;
a display; and
at least one non-transitory storage medium storing instructions readable and executable by the electronic processor to spatially register a liver imaged in a pre-operative medical image and the liver imaged in a CBCT image acquired by the CBCT imaging device by performing a spatial registration process including:
segmenting an outer surface of the liver in the pre-operative medical image to generate a first point set representing the segmented surface of the liver in the pre-operative medical image;
segmenting a surface of the liver in the CBCT image to generate a second point set representing the segmented surface of the liver in the CBCT image;
spatially registering the pre-operative medical image and the CBCT image by warping one of the pre-operative medical image and the CBCT image to the other of the pre-operative medical image and the CBCT image using point set registration comprising point matching of the first point set representing the segmented surface of the liver in the pre-operative medical image and the second point set representing the segmented surface of the liver in the CBCT image; and
displaying, on the display, a fused image combining the warped one of the pre-operative medical image and the CBCT image and the other of the pre-operative medical image and the CBCT image.

2. The image guidance device of claim 1 wherein the segmenting of the surface of the liver in the CBCT image includes:
performing occluded shape reconstruction using a statistical liver shape prior to reconstruct a missing portion of the segmented surface of the liver in the CBCT image.

3. The image guidance device of claim 1 wherein the segmenting of the surface of the liver in the CBCT image includes:
providing a user interface via which liver surface landmarks are received indicating the surface of the liver in the CBCT image; and
generating the segmented surface of the liver in the CBCT image based at least in part on the liver surface landmarks.

4. The image guidance device of claim 1 wherein:
the CBCT imaging device comprises a C-arm operated to stream CBCT images at an update rate, and
the instructions are readable and executable by the electronic processor to repeat the spatial registration process for other CBCT images of the stream to display, on the display, fused images updated at the update rate.

5. The image guidance device of claim 1 wherein the pre-operative medical image is a magnetic resonance imaging (MRI) image or a multiple-detector computed tomography (MDCT) image.

6. The image guidance device of claim 1 wherein the spatial registration process further includes:
segmenting the surface of the liver in the pre-operative medical image to generate the segmented surface of the liver in the pre-operative medical image.

7. The image guidance device of claim 1 wherein the spatial registering comprises:
warping the CBCT image to the pre-operative medical image using point set registration of the segmented surface (30) of the liver in the pre-operative medical image and the segmented surface of the liver in the CBCT image.

8. The image guidance device of claim 1 wherein displaying the fused image comprises:
displaying an overlay of the warped one of the pre-operative medical image and the CBCT image onto the other of the pre-operative medical image and the CBCT image wherein the overlay has partial transparency controlled by a transparency factor (a).

9. The image guidance device of claim 1, wherein displaying the fused image comprises generating the fused image using a partially transparent overlay.

10. A non-transitory storage medium storing instructions readable and executable by an electronic processor to spatially register an anatomical organ imaged in a pre-operative medical image and the anatomical organ imaged in a cone beam computed tomography (CBCT) image by performing a spatial registration process including:
generating a segmented surface of the anatomical organ in the CBCT image by segmenting the surface of the anatomical organ in the CBCT image and performing occluded shape reconstruction using a statistical shape prior for the anatomical organ to reconstruct a portion of the segmented surface of the anatomical organ in the CBCT image; and spatially registering the pre-operative medical image and the CBCT image by warping one of the pre-operative medical image and the CBCT image to the other of the pre-operative medical image and the CBCT image using point set registration comprising a non-planar grid of equally spaced points spread over segmented organ surfaces in the pre-operative medical image and the segmented surface of the anatomical organ in the CBCT image.

11. The non-transitory storage medium of claim 10 wherein the anatomical organ is a liver and the statistical shape prior is a statistical shape prior for the liver.

12. The non-transitory storage medium of claim 11 wherein the segmenting of the surface of the liver in the CBCT image includes:

providing a user interface via which liver surface landmarks are received indicating the surface of the liver in the CBCT image; and generating the segmented surface of the liver in the CBCT image based at least in part on the liver surface landmarks.

13. The non-transitory storage medium of claim 10 wherein the spatial registration process further includes:

segmenting the surface of the anatomical organ in the pre-operative medical image to generate the segmented surface of the anatomical organ in the pre-operative medical image.

14. The non-transitory storage medium of claim 10 wherein the spatial registering comprises:

warping the CBCT image to the pre-operative medical image using point set registration of the segmented surface of the anatomical organ in the pre-operative medical image and the segmented surface of the anatomical organ in the CBCT image.

15. The non-transitory storage medium of claim 10 wherein the spatial registration process further includes:

displaying, on a display operatively connected with the electronic processor, a fused image combining the warped one of the pre-operative medical image and the CBCT image and the other of the pre-operative medical image and the CBCT image.

16. The non-transitory storage medium of claim 15 wherein the instructions are readable and executable by the electronic processor to repeat the spatial registration process for other CBCT images of a stream of CBCT images to display the fused images updated at an update rate of the stream.

17. An image guidance method comprising:

acquiring a stream of cone beam computed tomography (CBCT) images of an anatomical organ using a CBCT imaging device; and for the CBCT images of the stream, performing a spatial registration process using an electronic processor, the spatial registration process for a CBT image including:

segmenting an outer surface of the anatomical organ in the CBCT image to generate a segmented surface of the anatomical organ in the CBCT image;

spatially registering a pre-operative medical image of the anatomical organ and the CBCT image by warping one of the pre-operative medical image and the CBCT image to the other of the pre-operative medical image and the CBCT image using point set registration of a segmented surface of the anatomical organ in the pre-operative medical image and the segmented surface of the anatomical organ in the CBCT image; and providing for display a fused image combining the warped one of the pre-operative medical image and the CBCT image and the other of the pre-operative medical image and the CBCT image.

18. The image guidance method of claim 17, wherein the segmenting of the surface of the anatomical organ in the CBCT image includes:

performing occluded shape reconstruction using a statistical shape prior for the anatomical organ to reconstruct a portion of the segmented surface of the anatomical organ in the CBCT image.

19. The image guidance method of claim 17, wherein the acquiring comprises:

acquiring the stream of CBCT images of the anatomical organ using the CBCT imaging device having a C arm that scans the anatomical organ over less than a 360 degree arc.

20. The image guidance method of claim 17, wherein the anatomical organ is a liver.

21. The image guidance method of claim 17, further comprising displaying on a display the fused image.

* * * * *